US012754915B2

(12) United States Patent

Amadieu et al.

(10) Patent No.: US 12,754,915 B2

(45) Date of Patent: Oct. 6, 2026

(54) DATA SEARCH PROCEDURE

(71) Applicant: AMADEUS S.A.S., Biot (FR)

(72) Inventors: Olivier Amadieu, Roquefort-les-Pins (FR); Jean-Marie Cazorla, Opio (FR); Yannick Devaux, Mougins (FR); Perrine Riviere, Biot (FR); Guillaume Le Grand, Biot (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/960,577

(22) Filed: Nov. 26, 2024

(65) Prior Publication Data

US 2025/0209075 A1 Jun. 26, 2025

(30) Foreign Application Priority Data

Dec. 21, 2023 (EP) .................................... 23315485

(51) Int. Cl.

*G06F 16/00* (2019.01)
*G06F 16/2455* (2019.01)
*G06F 16/248* (2019.01)

(52) U.S. Cl.

CPC ...... *G06F 16/24552* (2019.01); *G06F 16/248* (2019.01)

(58) Field of Classification Search

CPC ......................... G06F 16/24552; G06F 16/248
USPC .................................................. 707/600–899
See application file for complete search history.

(56) References Cited

U.S. PATENT DOCUMENTS

| | | | |
|---|---|---|---|
| 7,584,159 B1 | 9/2009 | Chakrabarti et al. | |
| 8,666,909 B2 | 3/2014 | Pinckney et al. | |
| 9,715,510 B2 | 7/2017 | Chittar et al. | |
| 10,204,121 B1 | 2/2019 | Thirumalai et al. | |
| 10,528,615 B2 | 1/2020 | Chittar et al. | |
| 12,411,841 B2 * | 9/2025 | Almaer | G06F 8/30 |

(Continued)

FOREIGN PATENT DOCUMENTS

WO WO-2008121872 A1 10/2008

OTHER PUBLICATIONS

Wikipedia, "Locality of reference", Wikipedia.org, Nov. 24, 2023, https://en.wikipedia.org/wiki/Locality_of_reference, Retrieved from the Wayback Machine in Jan. 15, 2026 from URL: https://web.archive.org/web/20231124090710/https://en.wikipedia.org/wiki/Locality_of_reference.

*Primary Examiner* — Michelle N Owyang

(74) *Attorney, Agent, or Firm* — PERRY + CURRIER INC.

(57) ABSTRACT

Method, systems and computer programs for handling search requests at a search platform are provided. A first search request indicates a first search parameter value and a second search request indicates a second search parameter value different from the first search value. The search platform determines a search context based on an evaluation of the first and second search parameter value and determines at least one third search parameter value corresponding to the search context. The search platform determines if a cache stores at least a given number of search results for the at least one third search parameter value. In response to determining that the cache does not store at least the given number of search results for the at least one third search parameter value, the search platform obtains at least one search result for the at least one third search parameter value for storing in the cache.

17 Claims, 12 Drawing Sheets

(56) References Cited

U.S. PATENT DOCUMENTS

| | | | | |
|---|---|---|---|---|
| 2016/0179953 | A1* | 6/2016 | Klotz, Jr. | G06F 16/24565 707/722 |
| 2019/0370676 | A1 | 12/2019 | Pinckney et al. | |
| 2020/0218724 | A1* | 7/2020 | Periyathambi | G06F 16/9566 |
| 2021/0406735 | A1* | 12/2021 | Nahamoo | G06N 3/09 |
| 2022/0156340 | A1 | 5/2022 | Li et al. | |
| 2024/0086489 | A1* | 3/2024 | Sachindran | G06F 16/9574 |
| 2024/0143593 | A1* | 5/2024 | Shekhar | G06F 16/219 |
| 2024/0232729 | A1* | 7/2024 | Bouvrie | G06N 20/00 |
| 2025/0148209 | A1* | 5/2025 | Jadhav | G06F 40/284 |

* cited by examiner

DATA SEARCH PROCEDURE

FIELD

The present disclosure relates to an information technology method and a system. More specifically, it relates to database search and computation technology providing search results in response to search requests.

BACKGROUND

Search requests from clients to search platforms typically include one or more search parameters and corresponding values which indicate requested search results. A platform processes a search request, identifies one or more search results being in accordance with the search parameter values and returns the search results to the client. In various scenarios, subsequent search requests with search parameter values relating to each other may be submitted.

U.S. Pat. No. 10,204,121 B1 describes a system configured to receive search session data that indicates, for each of multiple search sessions performed by a respective user, multiple search queries submitted by that user during the search session. The system may also receive search selection data that indicates, for each of multiple search queries resulting in a set of search results, a particular item selected from that set of search results by a respective user. The system may be configured to perform a co-occurrence analysis on the search data in order to generate one or more search indices that specify, for a given search query, one or more search queries determined to be related to the given search query according to the co-occurrence analysis. The system may be configured to process a client request for related queries that are related to a query of interest submitted by the user within that request.

In U.S. Pat. No. 9,715,510 B2, relevant image features about listing items in a network-based publication system are extracted for enabling image similarity searching of such listing items. When a seller lists an item, an image of the item is uploaded and may be sent to a picture processing service, which generates several digests. The digests are compressed data structures each representing a particular image feature such as edge, color, texture, or words. These digests are then stored in a search database, where the digests can be used to retrieve listings by image similarity at scale. A similar process can be performed for a query listing for searching the search database for items similar to the query listing.

US 2019/0370676 A1 provides a recommendation to a user through a computer-based advice facility, comprising collecting topical information, wherein the collected topical information includes an interestingness aspect; filtering the collected topical information based on the interestingness aspect; determining an interestingness rating from the collected topical information, wherein the determining is through the computer-based advice facility; and providing a user with the recommendation related to the topical information based on the interestingness rating.

Attention is drawn to improving the operating mechanisms underlying the processing of search requests with respect to efficient handling of subsequent search requests.

SUMMARY

The present disclosure seeks to provide improvements of the existing search methodologies, in particular in the area of dynamically determining a number of related search results at search request time. The present mechanisms are set forth by the independent claims.

According to a first aspect, method for handling search requests at a search platform is provided. The search platform receives, from a client, a first search request indicating at least one first search parameter value and also receives, from the client, a second search request indicating at least one second search parameter value, wherein the second search value differs from the first search value. The search platform determines a search context based on an evaluation of the at least one first search parameter value and the at least second search parameter value and determines at least one third search parameter value corresponding to the search context. The search platform determines if a cache accessible to the search platform stores at least a given number of search results for the at least one third search parameter value. In response to determining that the cache does not store at least the given number of search results for the at least one third search parameter value, the search platform obtains at least one search result for the at least one third search parameter value for storing in the cache. The search platform receives, from the client, a third search request indicating at least the third search parameter value, retrieves at least one search result for the third search parameter value from the cache and returns the at least one retrieved search result to the client.

Some embodiments further comprise receiving, from the client, one or more further requests respectively indicating at least a further search parameter value; determining the search context based on an evaluation of the further search parameter value.

In some embodiments, determining the search context comprises determining a distance between the first search parameter value and the second search parameter value; determining that additional search parameter values in the first search request and in the second search request are identical; determining a potential parameter value range for the at least one third search parameter value based on the distance between the first search parameter value and the second search parameter value and the identical additional search parameter values.

In some embodiments, determining the search context comprises determining at least one search parameter in the first search request and in the second search request to be discarded from determining the search context. More specifically, such embodiments may determine that a distance between a search parameter value of a certain search parameter in the first search request and a search parameter value of the certain search parameter in the second search request have a distance beyond a given threshold, and discard the certain search parameter from determining the search context.

In some embodiments, the third search parameter value is a value for a same search parameter of the first search parameter value and the second search parameter value, or wherein the third search parameter value is a value for a different search parameter than the search parameter of the first search parameter value and the second search parameter value.

Some embodiments further comprise receiving, from the client, a feedback indication for the at least one returned search result; storing the feedback indication for future search context determinations.

In some embodiments, determining the search context comprises evaluating search parameter value distances and identical search parameter values from past search requests of the client and/or of other clients.

In some embodiments, wherein the at least one third search parameter value is more general than the first search parameter value and the second search parameter value, wherein the more general at least one third search parameter value includes or excludes the first search parameter value and the second search parameter value.

In some embodiments, a level of generality of the at least one third search parameter value is derived from a similarity of the first search parameter value and the second search parameter value.

According to a second aspect, a computing system is provided comprising the computing platform, wherein the computing system is arranged to perform the aforementioned method aspect and embodiments.

Finally, a computer program is presented that comprises instructions which, when the program is executed by a computer, cause the computer to carry out the aforementioned method aspect and embodiments when executed by the computer.

Further refinements are set forth by the description.

These and other objects, embodiments and advantages will become readily apparent to those skilled in the art from the following detailed description of the embodiments having reference to the attached figures, the invention not being limited to any particular embodiments.

BRIEF DESCRIPTION OF THE FIGURES

Aspects and examples of the present disclosure are described with reference to the following figures, in which.

DETAILED DESCRIPTION

Generally, search requests are processed by the involved computing units, such as search platforms, caches and databases, in an incremental and iterative way, with a single computing unit being repeatedly involved in the computation in the response to a search request. This results in an increased computational and transmissional load on the involved computing units, such as for the generation of exhaustive responses and short response times.

Locality of reference refers to a mechanism of a processor of a computing unit to access the same set of memory locations repetitively over a short period of time. There are two basic types of reference locality: spatial locality and temporal locality. Spatial locality (or data locality) refers to the use of data elements within relatively close storage locations. Temporal locality refers to the reuse of specific data and/or resources within a relatively short time duration.

In the case of spatial locality, if a particular storage location is referenced at a particular time, then it is likely that nearby memory locations will be referenced in the near future. In this case, it can be attempted to predict the size and shape of the memory area around the current reference for which it is efficient to prepare faster access for subsequent reference.

In the case of temporal locality, if at one point a particular memory location is referenced, then it is likely that the same location will be referenced again in the near future. There is temporal proximity between adjacent references to the same memory location. In this case, a copy of the referenced data can be stored in faster memory storage to reduce the latency of subsequent references. Temporal locality is a special case of spatial locality, namely when the prospective location is identical to the present location.

Sequential locality, a special case of spatial locality, occurs when data elements are arranged and accessed linearly, such as traversing the elements in a one-dimensional array.

Among other aspects, some of these mechanisms are utilized herein in a particular context to render database search processes more efficient by reducing search iterations and response times.

Figure 1:
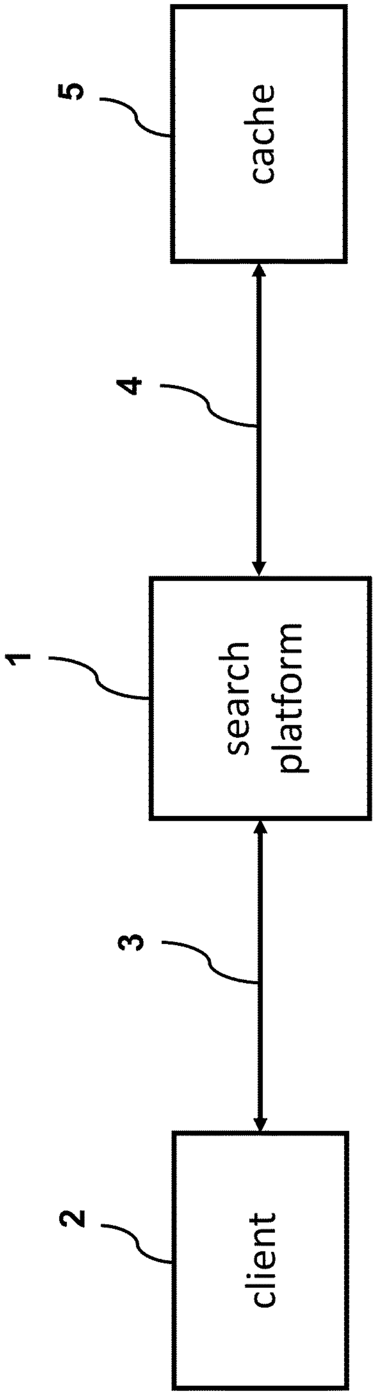
FIG. 1 illustrates a distributed computing system as described herein.

FIG. 1 shows a computing system comprising a search platform 1 and a client 2. Search platform 1 and client 2 are located anywhere and are individual computing machines such as personal computers, mobile stations such as laptops or tablet computers, smartphones, and the like, as well as, in some embodiments, more powerful machines such as database application servers, distributed database systems respectively comprising multiple interconnected machines, data centers, etc. In some embodiments, the search platform 1 might be a similar machine as the client 2, while, in other embodiments, the search platform 1 is more powerful than the client 2. In one embodiment, search platform 1 and/or client 2 are data centers which may be worldwide distributed. The search platform 1 may act as a server towards client 2, processing and serving requests of client 2.

Figure 12:
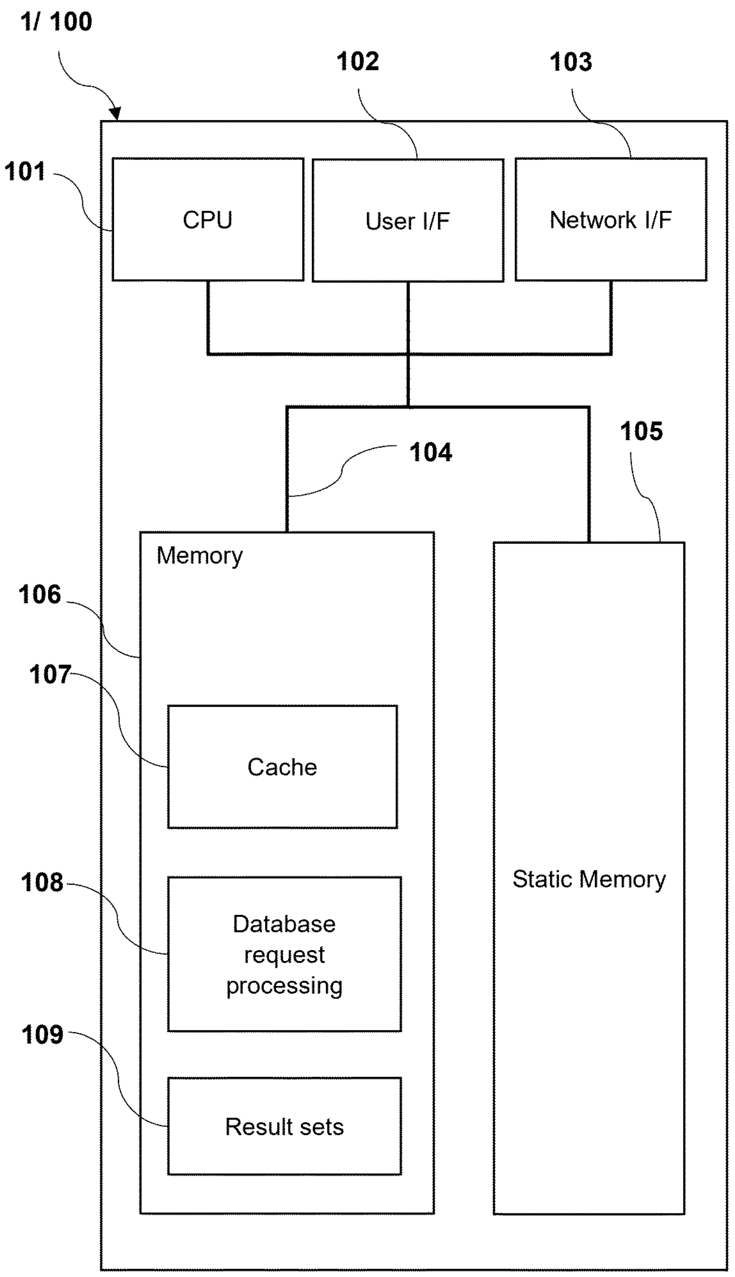
FIG. 12 is a diagrammatic representation of the internal components of a computing device as described herein.

Search platform 1 and/or client 2 may be constituted of several hardware machines depending on performance requirements. Search platform 1 and/or client 2 are embodied e.g. as stationary or mobile hardware machines comprising computing machines 100 as illustrated in FIG. 12 and/or as specialized systems such as embedded systems arranged for a particular technical purpose, and/or as software components running on a general or specialized computing hardware machine (such as a web server and web clients).

Search platform 1 and the one or more clients 2 are interconnected by a (frontend) communication interface 3. Search requests from a client 2 are received at the search platform 1 over the communication interface 3. The search platform 1 is also arranged to access a cache which stored pre-computed or pre-collected search results. The cache 5 may be accessed via a further (backend) communication interface 4.

The communication interfaces 3, 4 utilize a wired or wireless Local Area Network (LAN) or a wireline or wireless Metropolitan Area Network (MAN) or a wire-line or wireless Wide Area Network (WAN) such as the Internet or a combination of the aforementioned network technologies and are implemented by any suitable communication and network protocols. The communication interfaces 3, 4 may utilize any sorts of communication technology such as wired and/or wireless communication and/or mobile communication networks, one or more local area network, and/or one or more wide area networks such as the Internet, as well as any sorts of communication protocols such as mobile communication networks, WiFi, Ethernet, Internet Protocol (IP), Transport Control Protocol (TCP), Hypertext Transfer Protocol (HTTP) and others. Search requests from the client(s) 2 and responses to the search requests are sent over the frontend communication interface 3.

Search platform 1 may implement standardized communication protocols across the layers of the OSI reference model. Amongst others, the search platform 1 may employ initial processing mechanisms such as error recognitions and corrections, packet assembly, as well as determination whether a request has been received. Invalid messages may be discarded by search platform 1 for reasons of security and performance.

The search requests described herein may relate to any use case in the field of database, messaging and/or networking technology and others. Generally, requests may be given by any data structure received at the search platform 1 by one or more network protocols and may cause the search platform 1 to process the request. Typically, a search request causes the search platform 1 to react towards the requestor with a response, but any types of request processing is encompassed herein, including request processing without any responses. Typically use cases of the search request/response protocols described herein are search platforms, expert systems, messaging platforms, database systems, server systems, client/server-based request-response protocols, web shops, reservation systems, generative artificial intelligent systems, etc.

Figure 2:
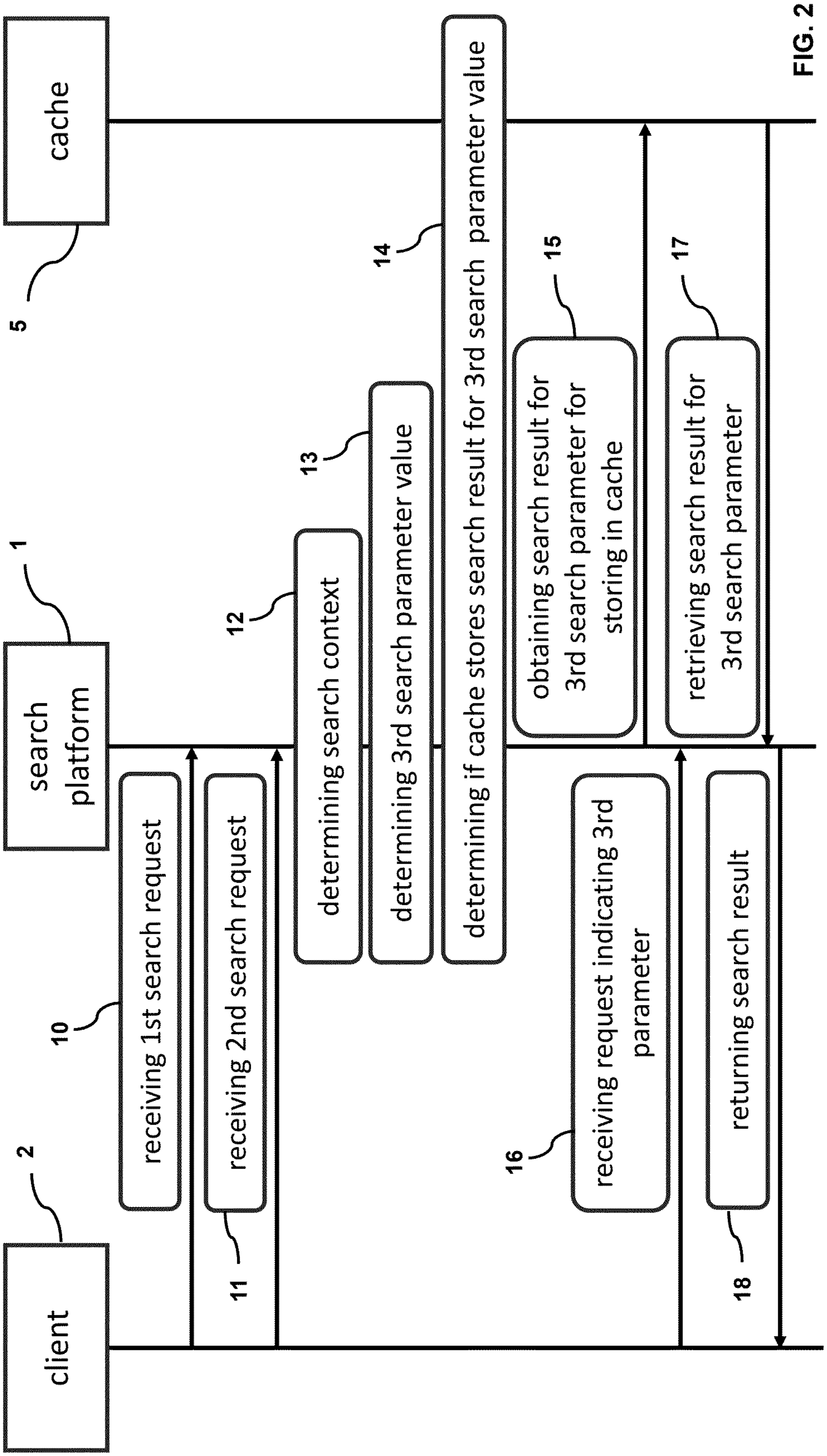
FIG. 2 depict a message sequence utilized by a search platform.

FIG. 2 shows a message sequence chart for handling search request at a search platform 1 from a (requesting) client 2 according to some embodiments. In an activity 10, search platform 1 receives, from the client 2, a first search request indicating at least one first search parameter value. The search platform 1 may respond to the first search request with a first response which includes a number of first search results that comply with the at least one first search parameter value. In an activity 11, search platform 1 receives, from the client 2, a second search request indicating at least one second search parameter value, wherein the second search value differs from the first search parameter value. Again, the search platform 1 may response to the second search request with a second response which includes a number of second search results that comply with the at least one second search parameter value.

The search platform 1 is enabled to recognize that the second search request originates from the same client 2 and constitutes a successor of the first search request (i.e. the first and second search requests form a sequence of related search requests) by way of functional information constituting a search correlator, such as a browser session identifier, a user identifier, a search request identifier, an IP address, a cookie, and the like.

In an activity 12, search platform 1 determines a search context based on an evaluation of the at least one first search parameter value and the at least second search parameter value and determines, in an activity 13, at least one third search parameter value corresponding to the search context. Generally, a "search context" as used herein refers to extrapolated common characteristics of search parameter values of multiple subsequent search requests from the same client. Thus, a search context may be determined by first identifying common characteristics of these search parameter values and then by varying or extending these common characteristics beyond the values given by the search parameter values.

For example, the common characteristics may constitute a search parameter value range (example: 5 to 10) encompassing the first search parameter value (example: 5) and the second parameter value (example: 10). The extension may further extend such range to an extended range (example: 4 to 11), e.g. by a given ratio (e.g. 20%). In another example, the first search parameter value and the second parameter value may already be ranges themselves (e.g. 20-30 and 40-60). The common characteristics may then be a sum or aggregation of these ranges (e.g. 20-60), and the search context may likewise correspond to an extended range (e.g. 10-70). The same methodology may also be applied for non-numeric and/or more complex search parameter values. Further examples will be given below.

With continued reference to FIG. 2, in an activity 14, search platform 1 determines if a cache 5 accessible to the search platform 1 stores at least a given number of search results for the at least one third search parameter value. In response to determining that the cache 5 does not store at least the given number of search results for the at least one third search parameter value, search platform 1 obtains, in an activity 15, at least one search result for the at least one third search parameter value for storing in the cache. Further, search platform 1 receives, in an activity 16, from the client 2, a third search request indicating at least the third search parameter value, and retrieves, in an activity 17 at least one search result for the third search parameter value from the cache and returns, in an activity 18, the at least one retrieved search result to the client 2.

This methodology enables the contextualization of content-related or similar search requests already in an early stage of a sequence of corresponding similar search requests, by taking advantage of spatial and temporal locality of the requested data, the localities being determined and defined by the search context. As a consequence, the third search request may be processed in an accelerated way since response data corresponding to the third search parameter value was already prepared beforehand and is readily available in response to the third search request.

Furthermore, the present mechanisms may be extended to further search requests from the same client 2, i.e. a series of three, four, five and more search requests. The search context may be incrementally refined with each receiving search request of the series of search requests may thus become more mature. The cached search results may be adapted accordingly, i.e. already cached search results becoming inconsistent with a further refined search context may be purged from the cache, while other search results not yet stored in the cache, but being then in accordance with a further refined search context may be retrieved/computed and then stored in the cache.

Hence, said methodology as described enables a dynamic and flexible context-based grouping of similar searches and their corresponding search results. The relevance of context data with respect to a specific content being requested by a search is therefore increased, resulting in an optimized processing of search request and therefore in a further decrease of the computational load.

Pre-collecting or pre-computing search results based on a series of related search requests from a client may also be utilized for responding to search requests from other clients which appear to operate in similar search contexts and/or certain feature correlations, such as a time correlation (a first client submits a sequence of search requests, and a second client submits a very similar sequence of search requests shortly after the first client). Depending on the particular use case, it may happen that other clients submit similar search requests or even series of search requests as a present client. Hence, populating the cache with search requests for anticipated follow-up search requests may also be leveraged when responding to initial and/or follow-up search requests from other clients. The search platform 1 first looks up if requested search results are present in the cache and, if so (e.g. because the search results have been previously stored in the cache based on a search context from a search request series of another client), utilizes the cached search results to respond to the search request in an accelerated manner.

Figure 3:
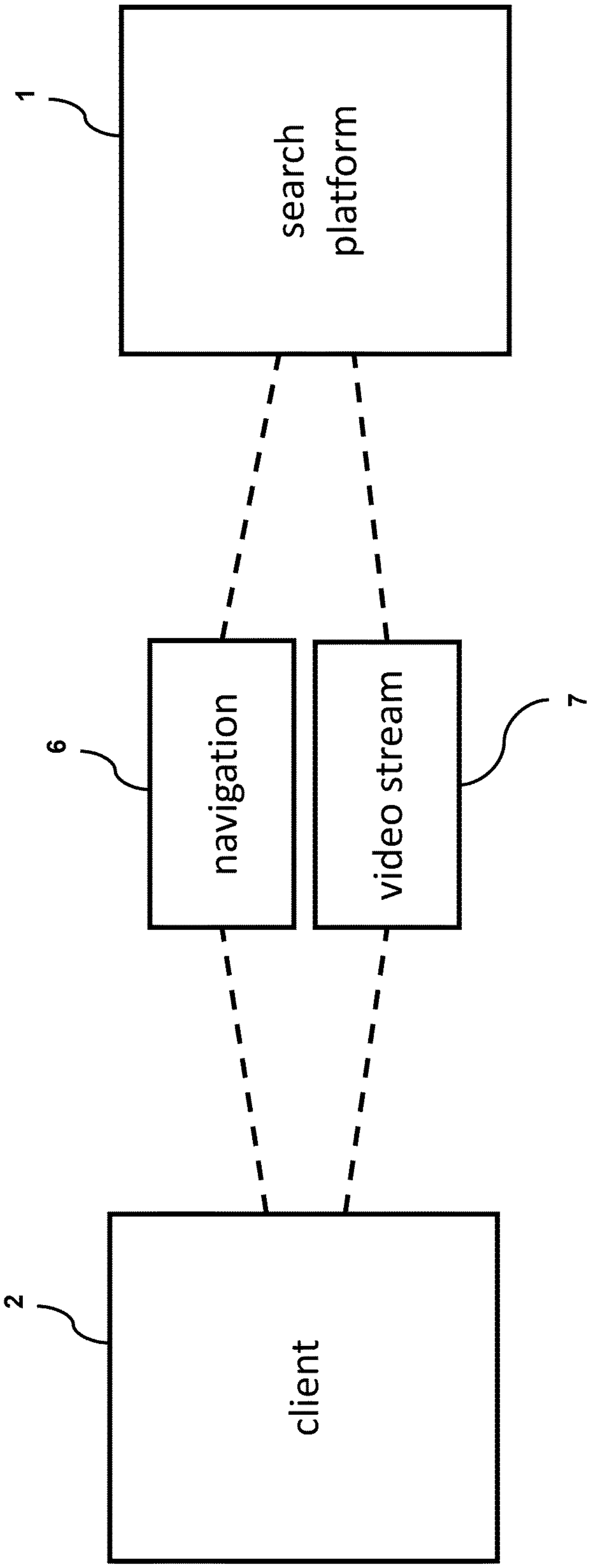
FIG. 3 shows two examples for the handling procedure as described herein.

FIG. 3 shows a number of non-limiting practical use cases for the present methodologies. One of the use cases as shown in FIG. 3 refers to a search request for navigation through a specific city, wherein a search result represents, for example, a street with data corresponding to the search parameters such as the city and further characteristics such as a street length as well as further parameter-value pairs such as the name of the street, the length, the width, and e.g. current traffic load, a current status (e.g. closed due to construction work), and so on. For example, the first search request may indicate a starting location and destination and first search responses may be a collection of streets forming a route between the start location and destination. A second follow-up search request may vary the destination, so that the collection of streets forming the route between start location and destination may be adapted. Determining the current traffic load or status may be computationally-wise heavy since this information may not be natively available at the search platform, but the search platform may need to retrieve current information from a remote server which incurs network load and latencies.

For example, a user of client 2 intends to drive within the city of Paris from location A in arrondissement XVI to location B in arrondissement XVIII and therefore poses a search, by e.g. using a street navigation system, for a street connection from location A to location B. The client 2 sends a first search request to search platform 1 acting as e.g. a frontend database for the street navigation system. The first search request received by search platform 1 from client 2 in activity 10 may indicate the starting point A, the destination B in the city of Paris (search parameter value 1=A, search parameter value 2=B) and also further search parameters such as the transportation type (e.g. car, bicycle, public transport, by foot), a route type (e.g. fastest route, shortest route, most efficient route), a date (now, in one hour, tomorrow, freely indicated date), and others. The search platform processes the first search request, identifies a route from A to B and also collects information about the current or estimated traffic load of this route. The current traffic load may be indicated by a normalized value, e.g. on a scale of 0 to 100, wherein 100 indicates high average traffic load on the route.

A second search request also received, in activity 11, by search platform 1 from client 2 refers to an additional destination C, being also located in arrondissement XVIII. The second search request refines the first search request in that destination B now becomes an intermediate destination on the way further to final destination C. The search platform 1 again determines the route from A to C via B, prepares the updated collection of streets and determines the current or estimated traffic load of the updated route. The search platform 1 then may return the updated route to the client 2.

Search platform 2 determines, in activity 12, the search context based on the first and second search request. For example, the search platform determines a geographical distance between destinations B and C (e.g. 3 km) and performs an extrapolation based on the determined geographical distance (e.g. adding 33%, resulting in 4 km). The exemplary search context may then be given by an area of a radius of 4 km around destination C, meaning that a further third search request may indicate a further destination within this area. The search context represents a range of potential further destinations of a third search request, i.e. a range of potential third search parameter values. In a refinement, the search platform may also compile a shortlist of popular destinations within the 4 km radius, e.g. twelve points of interest (such as transport facilities, offices, touristic locations). In such refinement, the third search parameter (a destination D) may then be given by these twelve points of interest.

In some embodiments, the extrapolated geographical distance may be determined based on clusters of first and second parameter values, e.g. on a cluster comprising several destinations located in a range (e.g. 0 to 0.5 km) around B and on a cluster comprising several destinations located in a range (e.g. 0 to 1 km) around C. The distance between said two clusters may be determined based on the centroid of said two clusters and the extrapolated distance defining the search context may be a radius centered on the centroid of the cluster around C.

The search platform 1 may then determine if the cache has stored street data and corresponding current traffic load information for the streets specified by the search context, i.e. within the 4 km area around C or, according to the refinement, streets forming routes from destination a, B and/or C to any one of the shortlist of popular destinations. Since cache 5 has not stored corresponding search results for said extrapolated radius yet, search platform 1 obtains in activity 17 those corresponding search results.

In activity 16, search platform receives a third search request from client 2 together with the indication of a third search parameter, for example a replacement of destination C by destination D, 2 km from destination C. In activities 17 and 18, search platform 1 determines the updated route starting point A via B to D, retrieves the corresponding streets and traffic information from the cache 5 and returns these search results to client 2.

Figure 4:
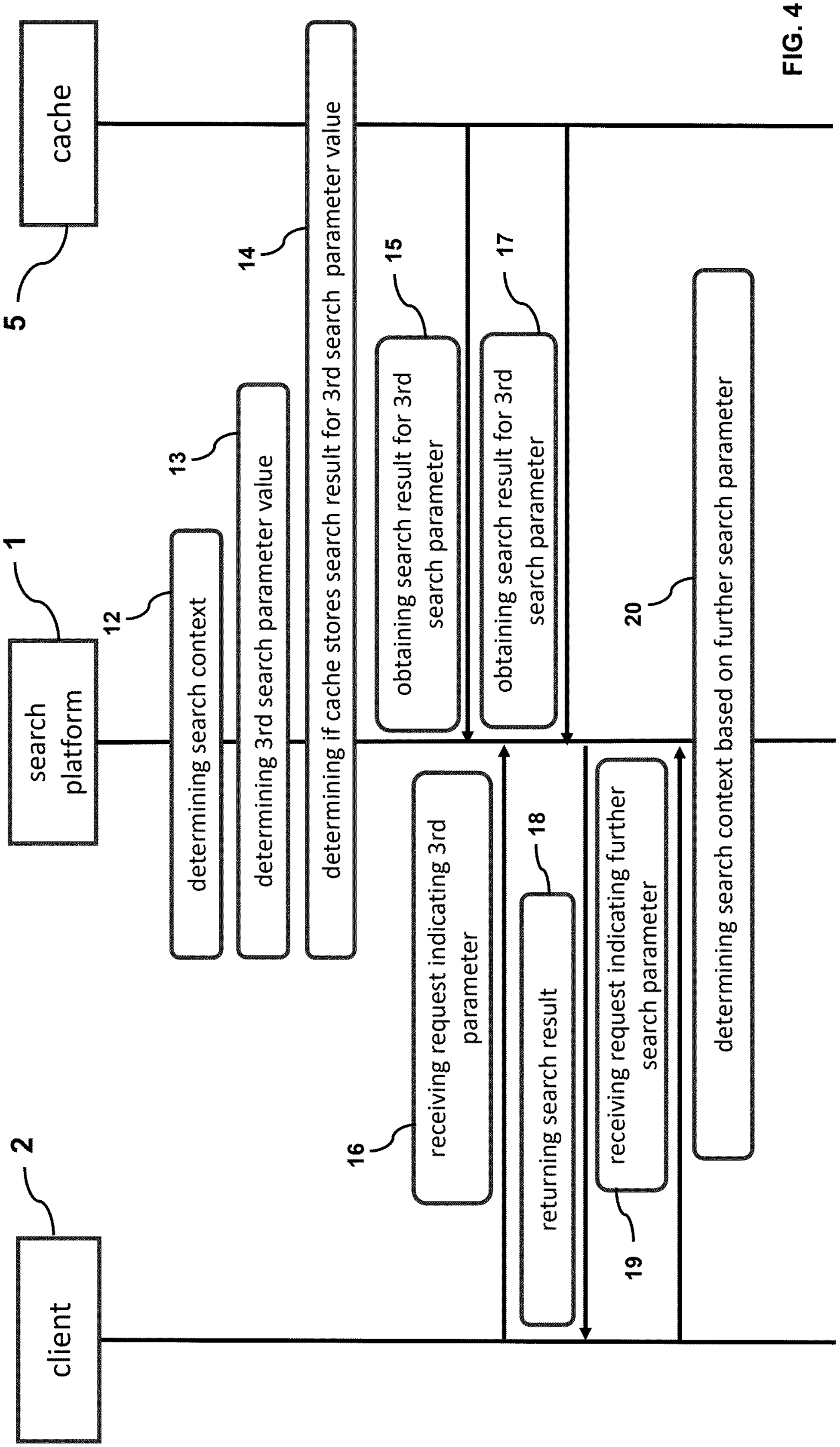
FIG. 4 depicts an optional message sequence utilized by a search platform.

In some embodiments and as shown in FIG. 4, the handling of search request at search platform 1 further comprises receiving, in an activity 19, from the client 2, one or more further requests respectively indicating at least a further search parameter value and determining, in activity 20, the search context based on an evaluation of the further search parameter value.

With reference to the aforementioned navigation example, the user of client 2 may send a further search for a still a further destination E between the arrondissements XVI and XVIII, significantly remote from destination D (e.g. 15 km). In activity 19, search platform 1 may receive a corresponding request and may determine, in activity 20, an updated search context for street connections between the arrondissements XVI and XVIII lying within the wider areas of Paris.

Determining an updated search context based on a third search request (and potentially still further search requests) may lead to a convergence of the search request. The degree of convergence depends on the level of convergence the search parameter values in the series of search requests. The series of search parameter values may be analyzed by the search platform 1 to determine if the search context is to become more specific. For example, while the first two destinations B and C have been relatively far apart, additional destinations D and E may be relatively close to destination C, so the search context given by the distance between the destinations may actually become smaller with an increasing number of search requests.

In other instances, the search context may become broader or may shift with an increasing number of search requests. For example, further search requests may add additional destinations at the end of the route, effectively extending the route further and further. Here, the significance of earlier search requests decreases, while search parameters in later search requests are more relevant. This may be implemented by a methods of time series analysis, such as a linear weighted moving average computation.

In some embodiments, the cache 5 may store intermediate search results, which may require significant computational resources to be processed and/or computation rules for the computation of the search results. In the example of the aforementioned navigation system, the destinations D and E may be accessed via a common point e.g. the "Place de l'Etoile" as intermediate search result. In some embodiments, the cache 5 may store intermediate routes toward that common point. In some embodiments, the processing of the third search request may complete the intermediate route. In some embodiments, the intermediate search result may be comprised by a cluster of at least two intermediate search results.

Other use case examples may relate to video streaming (FIG. 2), wherein the client 2 may sequentially request certain video products (first search request: movie F, quality HD, rent; second search request: movie G, quality HD, buy). The search platform 1 may determine a search context, e.g. given by the common category of movies F and G (e.g. category "science fiction"), may determine a number of popular further movies of the same category (movies H, I, J, K and L) and may populate the cache 5 with these further movies in anticipation of a third search request. Once the third search request (movie K, quality HD, rent) is received, the third search request can be responded to utilizing the cache 5.

This enables a flexible adaptation of the search context data to a varying search scope occurring within a sequence of related search requests, through exploiting the locality of the so far requested search results as well as by pre-fetching related search results, resulting in reduced response times for follow-up search requests. Note that the principle of locality is adapted by the present methodologies to a locality at search parameter value level. One or more search parameter values of at least two search requests are recognized to be related to each other if these search parameter values are determined to have a common characteristic and thus can form a search context.

Figure 5:
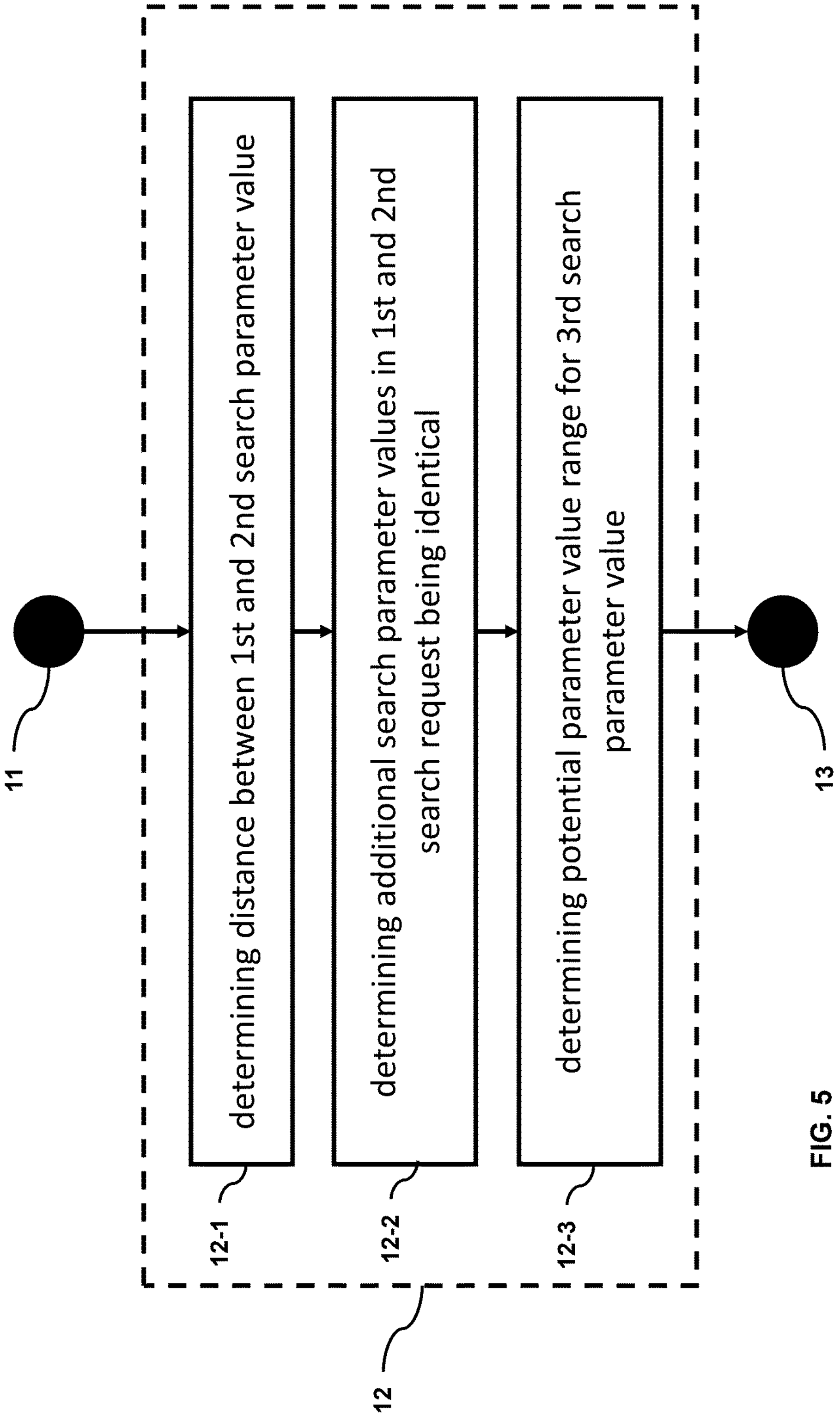
FIG. 5 illustrates a procedure for the determination of a search context.

For example, in some embodiments and as shown in FIG. 5, determining 12 the search context comprises determining, in an activity 12-1, a distance between the first search parameter value and the second search parameter value, determining, in an activity 12-2, that additional search parameter values in the first search request and in the second search request are identical and determining, in an activity 12-3, a potential parameter value range for the at least one third search parameter value based on the distance between the first search parameter value and the second search parameter value and the identical additional search parameter values. Search parameter values being identical in the first and second search request may be an indication to the search platform 1 that these search parameters may also remain fixed in further search request of the present series of search requests. Hence, such identical search parameter values enable the search platform 1 to identify which search parameters out of multiple search parameter parameters in the first and second search request may be relevant for defining the search context, namely in particular such search parameters with values that have changed from the first search request to the second search request by at least a given extent and thus constitute a certain search space dimension. The term "identical" may not be understood in the sense of absolute identities, but may also encompass small variations in the sense of use-case-typical tolerances.

Note that the term "distance" is not (necessarily) used in the geographic sense herein as in the aforementioned example of transport navigation and geographical distances between locations. Rather, distance generally refers to a level of similarity or dissimilarity between search parameter values of any type. For example, if the search parameter values considered are numbers, the distances may be obtained by subtracting the values from each other. If the search parameter values are strings, a Hamming distance, a Levenshtein distance, a longest common subsequence (LCS) distance or another type of edit distance between the strings may be determined. Any suitable metric to determine a similarity or dissimilarity between search parameter values may be employed. It is assumed that the search parameter values to be compared are of the same or at least comparable type (e.g. the first and second parameter value denote locations, prices, colors, words, etc.).

In embodiments, the distance between search parameters may be obtained by using embeddings via deep learning machine learning methods. For example, complex search parameter values may be compared by a deep neural network to output strings, numerical values, vectors or the like enabling a distance determination via mechanisms as discussed above. Such more complex distance determination mechanism may be used for particular search parameters such as images (i.e. in the use case of image-based searches), natural language, audio, video, and so on. Moreover, an edit distance, such as a Levenshtein distance, between two strings may be obtained based on the minimum number of insertions, deletions and substitutions required to transform one of the two strings into the other one.

Figure 6:
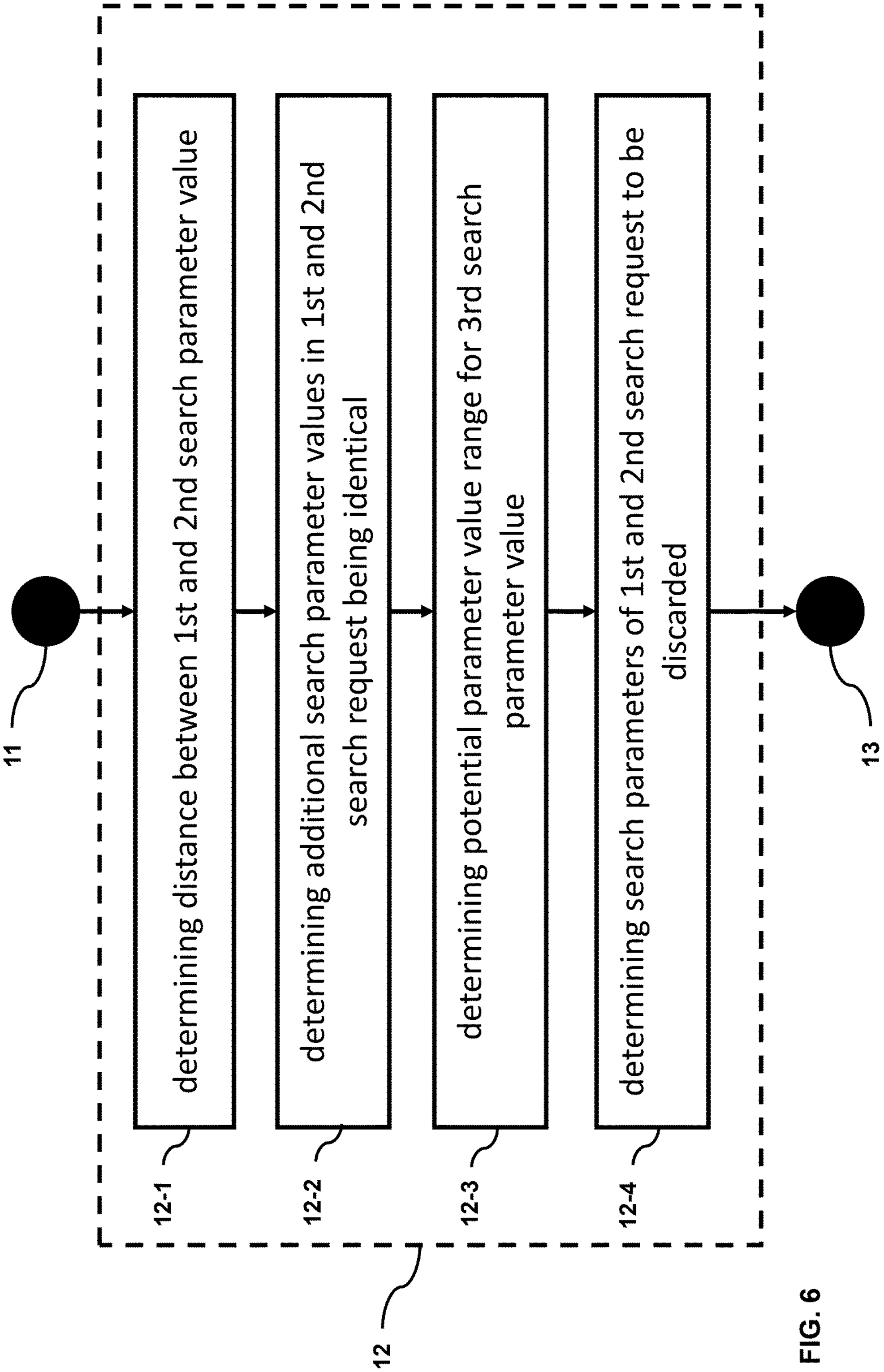
FIG. 6 shows a further procedure for the determination of a search context.

Referring again to the example of street navigation system for the search for street connections, search platform 1 may determine 12-1 the distance between the destination B and the destination C, e.g. 3 km. In addition, search platform 1 may determine 12-2 that an additional search parameter values of the first and second search request relating to the requested traffic load are identical. For example, both the first and the second search request have asked for the shortest, not for the fasted route, and/or both the first and the second requests, have asked for a navigation for bicycles as opposed to cars. As this additional parameter of route and/or vehicle type is identical in the first and second request, the search platform 1 does not consider any extrapolation for defining the search context, but may expect that also any third search request again asks for the shortest route. Thus, the search context may be given by an extrapolated distance between the first and second parameter value (e.g. 4 km) and the third parameter value anticipated for any third search request may be determined based on the search context, as already described above. In some embodiments and as shown in FIG. 6, determining 12 the search context may comprise determining 12-4 at least one search parameter in the first search request and in the second search request to be discarded from determining the search context. In particular, if the distance between the first and second search parameter values exceeds a given threshold and, accordingly, the similarity between the first and second parameter values is lower than the threshold, the first and second search parameter values are determined to be dissimilar and are disregarded from determining the search context. For example, if destination B and C are geographically more than 10 km apart, the destinations are assessed to be dissimilar by the search platform 1 and no search context is determined in this situation.

Referring to the example of the navigation search for street connections, the search platform 1 may discard one or multiple search parameters of the first and second search request from determining the search context. For example, the first and second search requests may include a search parameter relating to a certain quality of service of the street connection (e.g. excluding highways). The search platform may determine that such search parameters are not relevant for defining a search space for any third search request and may therefore ignore this search parameter for the sake of determining the search context.

There may be situations, in some embodiments, in which the first and second search parameter values are still assessed to be sufficiently similar (e.g. their distance is within a given threshold), but distance and extrapolation may lead to a relatively broad search context and, thus, possibly to a high number of potential third search parameter values. In such situations, it should be avoided to populate the cache 5 with a higher number of anticipated search results as pre-computing or pre-collecting many search results may be considered to be inefficient in terms of utilization of computation and/or network resources. Hence, in such situations, mechanisms are sought to limit the number of search results to be cached to a reasonable figure.

For example, in such situations, the degree of extrapolation of the distance between the first and second search parameter value to define the search context may depend on the distance. Generally, the greater the distance between the first and second search parameter value is, the smaller the degree of extrapolation may be. And, the other way around, the smaller the distance between the first and second search parameter value, the greater the degree of extrapolation may be. Such dependency may be implemented by defining levels of distance/similarity between search parameter values and corresponding levels of extrapolation, such as distance below threshold T1→extrapolation 50%, distance below threshold T2 (T2>T1)>extrapolation 30%, distance below threshold T3 (T3>T2)→extrapolation 10%, distance above threshold T3→dissimilarity>no extrapolation. In a machine-learning-based implementation (see further below), a machine learning model may be trained to dynamically determine suitable levels of extrapolation.

A further (alternative or additional) way to limit the number of search results to be cached in situations of broad search contexts may be to limit the number of third parameter values and or directly to specify a maximum number of search results to be newly cached per search context generation or update. For example, irrespective of the particular definition of the search context, a maximum number of X search requests may be allowed to be cached per search context (re-) definition iteration.

Figure 7:
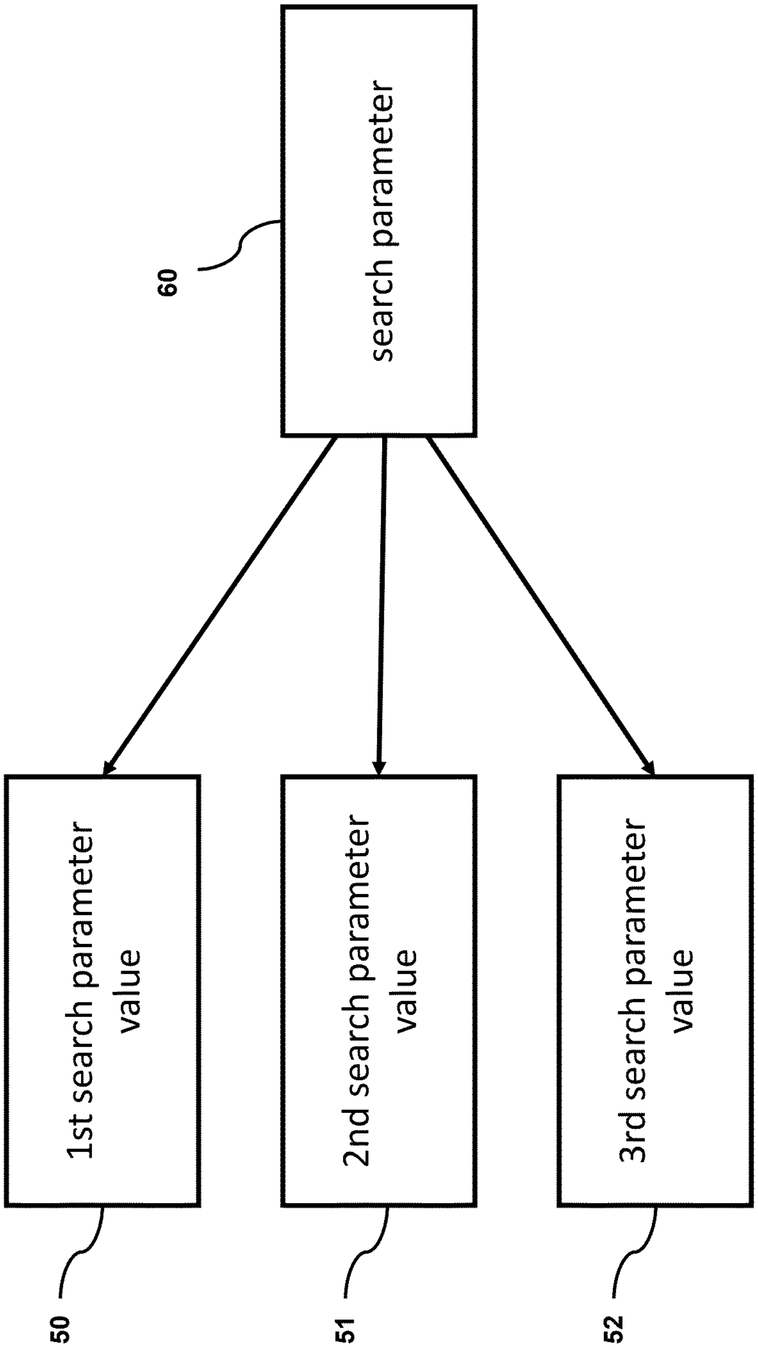
FIG. 7 shows an association of search parameter values of a search parameter as described herein.
Figure 8:
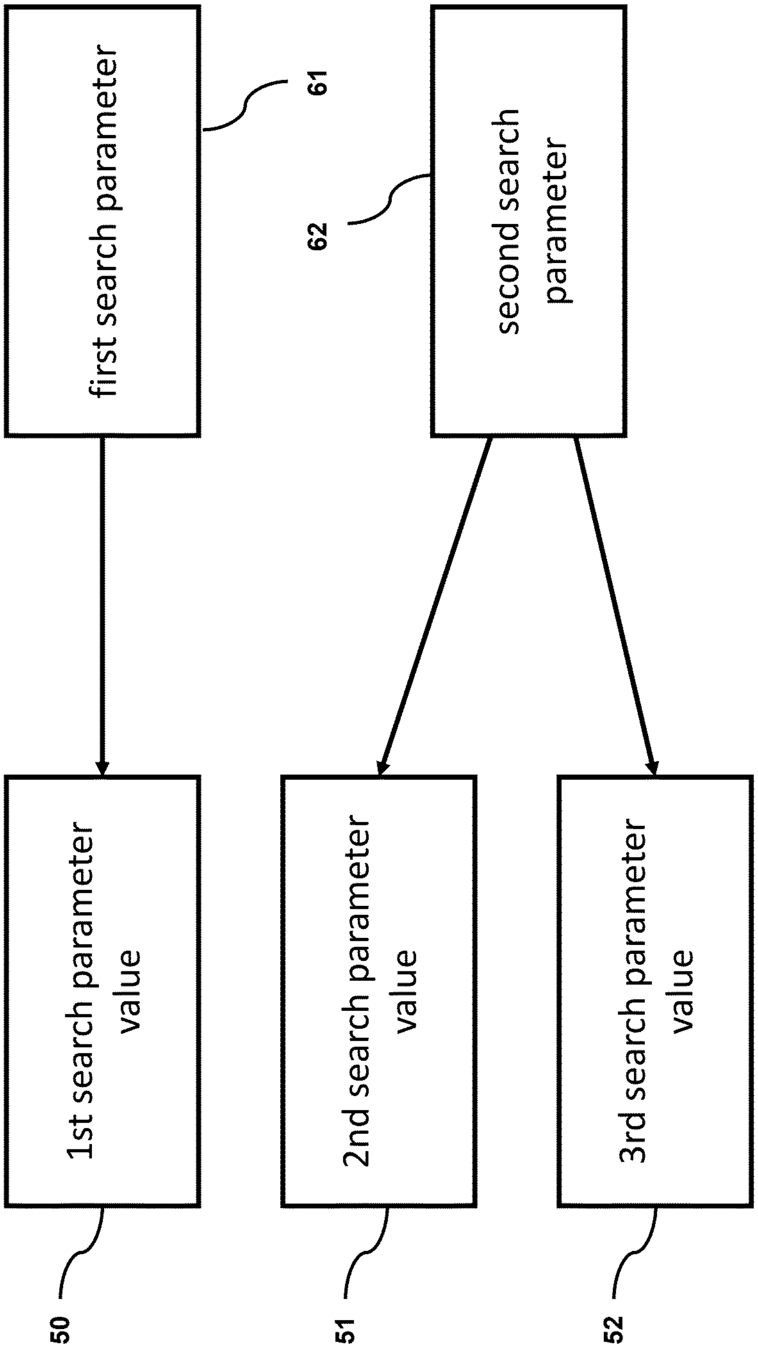
FIG. 8 depicts a further association of search parameter values of a search parameter as described herein.

In some embodiments and as shown in FIGS. 7 and 8, the third search parameter value 52 may be a value for a same search parameter 60 of the first search parameter value 50 and the second search parameter value 51, or wherein the third search parameter value 52 may be a value for a different search parameter 62 than the search parameter 61 of the first search parameter value 50 and the second search parameter value 51.

Referring again to the example of a street navigation system for the search for street connections, search parameter values of the first and second search request utilized by the search platform 1 to determine the search context are values of the search parameter destination (destinations B, C, D). The third search parameter values 52 derived from the search context may likewise be values of the destination (e.g. the shortlist of twelve points of interest within the area of a radius of 4 km). Therefore, the search parameter values 50, 51, 52 of the first, second and third search requests are associated to the parameter destination and therefore to the same search parameter 60 (FIG. 7).

Alternatively, in various refinements, the one or more third search parameters 52 relate to a different search parameter than those parameters of the first and second search parameter values 50, 51. For example, the search platform may also determine a likelihood that not only the destination, but also the starting location of the navigation search request may be changed, although the starting point A was the same in the first and second search request. Hence, in addition to determining the search context based on the extrapolation of the destinations (B and C), the search context may also be specified on the basis of an extrapolation of the starting location, e.g. by adding a default radius (e.g. 2 km) around starting location A (FIG. 8).

The search context may also encompass multiple search parameters, i.e. be a multi-dimensional search context. For example, the first search request may indicate four search parameters (1, 2, 3, 4) and corresponding values (e.g. 1: RFV, 2: UZT, 3: KMJ, 4: CXY). The second search request may indicate the same four search parameters, wherein two values remain the same and two other values feature a certain variation (e.g. 1: RFV, 2: IZT, 3: KMJ, 4: CYZ). The search platform recognizes that both search requests originate from the same client (e.g. by way of the session identifier), determines that search parameters 1 and 3 are identical in both requests and are thus determined to be constant for the purpose of determining the search context. Search parameters 2 and 4 are, however, recognized to have changed in the second search request and the search platform 1 determines that the search context is to be generated based on the distance of the search parameter values (2: distance between UZT and IZT, 4: distance between CXY and CYZ). The same approach may be extended to three, four, five and more parameter dimensions.

Figure 9:
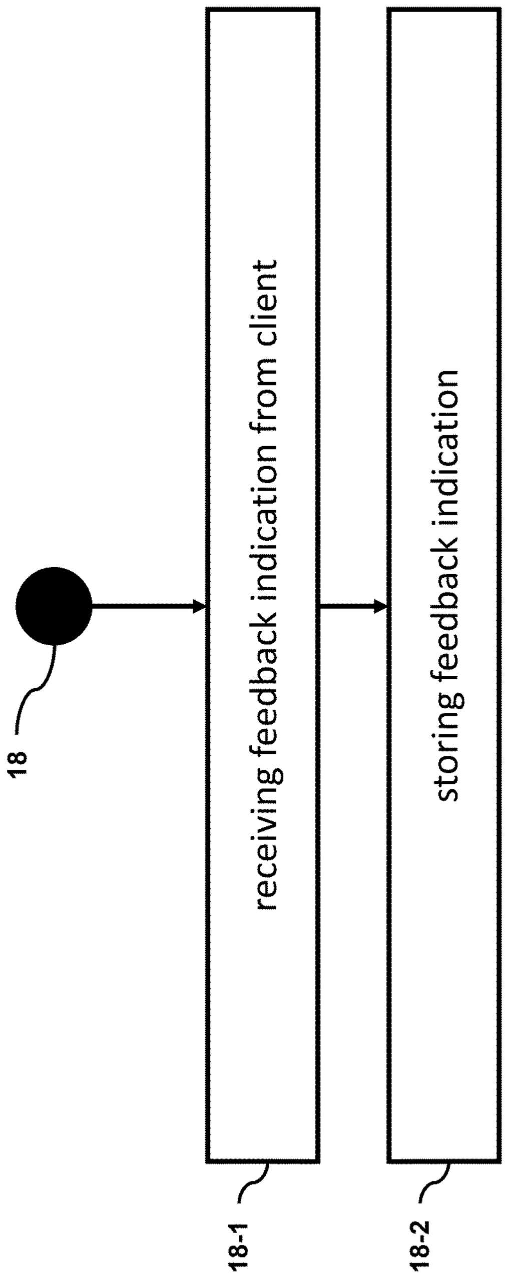
FIG. 9 shows a further optional message sequence utilized by a search platform.

In some embodiments and as shown in FIG. 9, the handling of search request at the search platform 1 may further comprise receiving, in an action 18-1, from the client 2, a feedback indication for the at least one returned search result and storing, in an action 18-2, the feedback indication for future search context determinations. Referring to the aforementioned example relating to the navigation search of street connections, search platform 1 may receive 18-1 as feedback indication from client 2 an indication that the returned response (activity 18) to the third search request indicating the third search parameter, i.e. the route from A via B to D, is actually the route utilized for navigation. The search platform 1 stores 18-2 this feedback indication for the future determination of the search context relating to street connections. This also provides a flexible and instant adaptation of the search context to the (future) search intents of the user/client 2, thereby reducing the number of search request to be sent to and to be received and processed by the search platform 1, further reducing the computational and transmission load.

Figure 10:
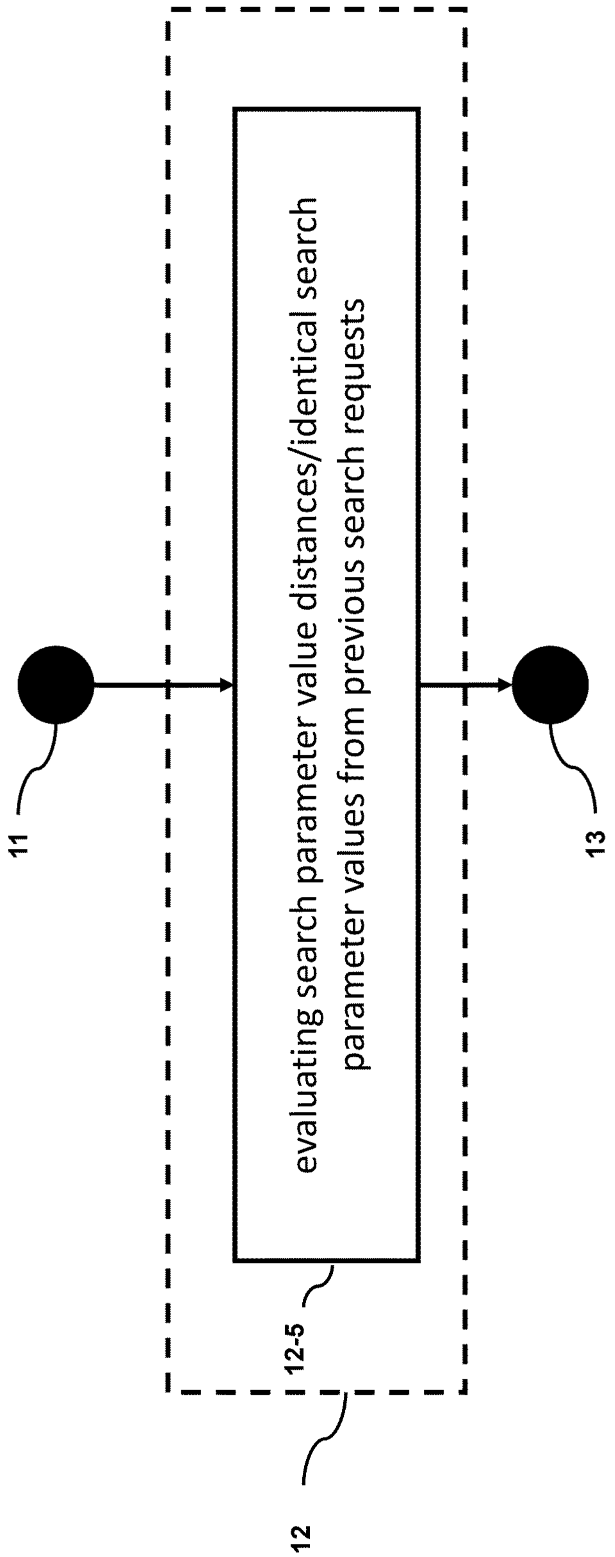
FIG. 10 depicts a further procedure for the evaluation of a search context.

In some embodiments and as shown in FIG. 10, determining 12 the search context further may comprise evaluating 12-5 search parameter value distances and identical search parameter values from past search requests of the client and/or of other clients. With continued reference to the example of navigation search for street connections, search platform 1 may have received as previous navigation search requests from multiple clients 2 requesting street connections in New York City between the boroughs of Manhattan and Queens. These past search requests may have yielded search patterns for sequences of navigation requests varying destinations, or adding additional final or intermediate destinations, and/or adding starting locations. The patterns may form historical statistics which can be used to derive degrees of extrapolations for defining search contexts. For example, the historical statistics may yield that the majority of follow-up navigation requests adds final destinations in a vicinity of a 5 km radius around the previously final destination, and in a semicircular corridor pointing away from the line of sight between starting location and previous final destination. These insights may be transferred for determining search context for other navigation requests in other cities and/or by other clients.

In order to generate such historical statistics, main data representing the series of first, second, third (and potentially further) search requests, defined search contexts and determined third search parameter values may be logged by the search platform 1. Portions of such logged data may be made available, manually reviewed and audited, and, e.g. the search request series data representing third search requests following first and second search requests, also utilized as training data for training a machine learning model to implement the present methodologies.

It may also be logged, in some embodiments, to which extent the received third search requests actually matched the search results which were stored into the cache 5 based on the search context, i.e. if and to which extent the pre-fetching or pre-computation of the search results after reception of the second search request was helpful and indeed anticipated the third search request. Matching between third search request and cached search results indicates that the search context and the third search parameter(s) were defined adequately, while non-matching (e.g. the third search request indicated a third search parameter value outside the search context, i.e. the search context was too specific; or the third search request varied a different search parameter which was not recognized by the search platform 1 to be relevant for defining the search context) indicates a possibility to further fine-tune the search context and third search parameter value definition. The conclusion from this logging may thus be used to adapt the rules for defining the search context and third parameter value selection or further train a machine learning model implementing the present methodologies.

Figure 11:
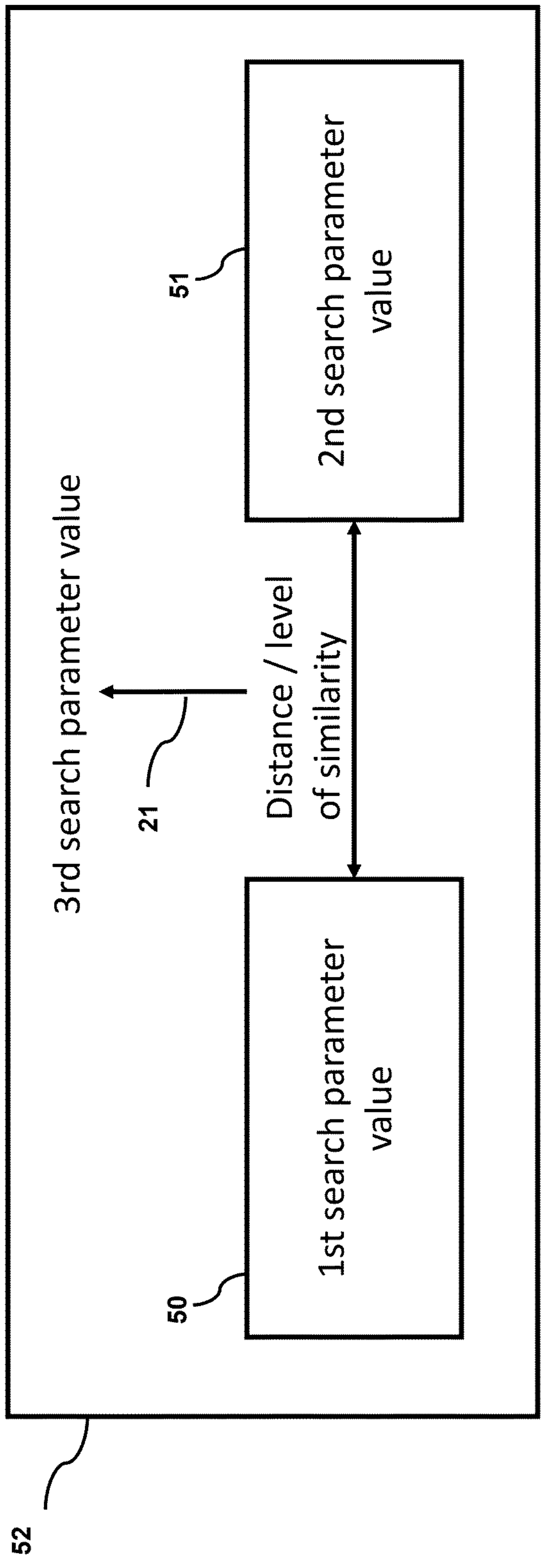
FIG. 11 illustrates a level of generality for a third search parameter value.

In some embodiments, as visualized by FIG. 11, the at least one third search parameter value 52 is more general than the first search parameter value 50 and the second search parameter value 51, wherein the more general at least one third search parameter value includes or excludes the first search parameter value and the second search parameter value. For example, the first search request may ask for color="white", the second search request may ask for color="black". The search platform 1 may evaluate the two search parameter values, may determine the search context to be color space=grey scale, and the third parameter search values may be a set of grey scale colors excluding "white" and "black" (as the first and second search request have already asked for "white" and "black").

In some embodiments, with continued reference to FIG. 11, a level of generality of the at least one third search parameter value is derived, in activity 21, from a similarity of the first search parameter value and the second search parameter value. Generally, the more similar the first and second search parameter values are (i.e. the smaller the distance between the two values is), the more specific the search context is to be determined. On the other hand, the less similar the first and second search parameter values are (i.e. the greater the distance between the two values is), the more general the search context is to be determined.

This mechanism is given when the search parameter values are numerical values and the distance between two numerical values is extrapolated by a given percentage. However, this mechanism may also apply in cases where the search parameter values are categorical values (e.g. colors, as mentioned above). If the first and second search request indicate two different shades of blue, the search context may be "blue". If the first search request indicates "red" and the second search request indicates "yellow", the search context may be determined to encompass the color spectrum from red to yellow (e.g. including, by extrapolation, some red shades towards blue and some yellow shades towards green). Hence, the search context and, accordingly, the third search parameter value (or set of third search parameter values) may be broader, the less similar the first and second parameter values are.

However, if the distance between the first and second search parameter values exceeds a given threshold and, accordingly, the similarity between the first and second parameter values is lower than the threshold, the first and second search parameter values are determined to be dissimilar and are disregarded from determining the search context, as described above.

One exemplary use case of the present methodologies relates to a travel (meta-) search system wherein the search requests and search results relate, for example, to travel recommendations, flights, multi-model travel packages, etc. In such non-limiting system, the present mechanisms may be utilized to populate a cache of the travel search system in response to a series of travel search requests from a client device. The search correlator enabling the travel search system to recognize that multiple search requests originate from the same client may be a travel identifier.

For example, a client may first search for flights on 15 Jul. 2023 from Paris to Miami. The search travel system collects various flight offers from multiple carriers (such as Lufthansa, Air France, United, etc.) and returns these offers to the client. The client then submits a follow-up search from Paris to Havana on 15 Jul. 2023. The search travel system collects various flight offers from operating airlines (such as Lufthansa, Air France, Cubana, etc.) and returns these offers to the client.

The travel search system then determines that search context by recognizing that the flight date was identical in both, the first and the second search request, but notices a variation of the destination airport. Hence, the destination airport is specified to be a search parameter controlling the search context, and Miami and Havana are the first and second search parameter values. The travel search system determines, for example, that the geographical distance between Miami and Havana is 370 km, extrapolates the distance to an area of 555 km (+50%) around the city pair and then determines third search parameter values of Nassau, Grand Bahama, Key West and Southwest Florida. The travel search system then retrieves flight offers from airlines operating these flight connections for 15 Jul. 2023 and stores these pre-collected search results in the cache. The client then submits a third search request for flight from Paris to Nassau on 15 Jul. 2023 and the travel search system is enabled to respond to this search request on an accelerated basis using the pre-collected search results in the cache.

Irrespective of the particular use case in which the present methodologies are utilized, the functionalities described herein may be implemented in various ways. For example, a set of rules may be utilized to enable the search platform 1 to identify the first and second search parameter value in the first and second search request, to determine a level of similarity and/or a distance between the first and second search parameter value, to define the search context and determine one or more third search parameter values. In a more sophisticated implementation, one or more machine learning models may be utilized to provide these functionalities.

Without loss of generality, in the use case of a travel search system, search parameter values such as origin, destination, travel dates, number of passengers, travel options, and so on may be input into the machine learning model. The input may be provided in form of a compact input vector. The machine learning model may be trained by unsupervised learning and e.g. re-trained on a regular basis to cope with varying data and search results (e.g. new airports becoming available, other airports closed, new travel options offered). As the input and training data is a series of multiple search requests, the machine learning model may be of a type particularly suitable for analyzing time-series data, such as a Recurrent Neural Network (RNN), in particular a Long Short-Term Memory (LSTM) or a Gated Recurrent Unit (GRU) or a Transformer Neural Network.

Note that the present methodologies as described above, if applied by a search platform 2, do not necessarily have to applied for all search requests and follow-up search requests received by the search platform 2. For example, the search platform 2 may apply the methodologies for some types of search requests, but may not apply the methodologies for other types of search requests which are then handled in a traditional manner. Or the search platform 2 may apply the methodologies for search requests from some clients 2, but not for search requests from other clients. Or the search engine may apply the methodologies during some periods of time, but not during other periods of time, etc.

As mentioned above, the present methodologies may be provided by a computer-implemented method, by an apparatus such as a controller as well as by computer program instructions which, when executed by at least one processor, realizes the operations described above.

FIG. 12 is a diagrammatic representation of the internal components of a computing machine 100 implementing the functionality of the search platform 1 and a client 2. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A display, an alpha-numeric input device and a cursor control device may be provided as examples of user interface 102. The network interface device 103 connects the computing machine 100 implementing the computing device 1 with the client 2. Furthermore, network interface device 103 also connects the computing machine 100 implementing the search platform 1 with the client 2.

Computing machine 100 includes a memory 106 such as main memory, random access memory (RAM) and/or any further volatile memory. The memory 106 may store temporary data and program data 107 to facilitate the functionality of the search platform 1, including program data to realize the receiving 10, 11 and 16, from the client 2, of a first, second and third request.

In addition, the memory 106 may store temporary data and program data 107 to realize, by the search platform 1, the determining 12 of a search context based on an evaluation of the at least one first search parameter value and the at least second search parameter value, the determining 13 of at least one third search parameter value corresponding to the search context and the determining 14 if a cache accessible to the search platform 1 stores at least a given number of search results for the at least one third search parameter value, Further, the memory 106 may store temporary data and program data 107 to realize, by the search platform 1, in response to determining that the cache does not store at least the given number of search results for the at least one third search parameter value, the obtaining 15, of at least one search result for the at least one third search parameter value for storing in the cache.

Further, the memory 106 may store temporary data and program data 107 to realize, by the search platform 1, the receiving 16, from the client 2, of a third search request indicating at least the third search parameter value, the retrieving 17 of at least one search result for the third search parameter value from the cache and the returning 18, of the at least one retrieved search result to the client 2.

A set of computer-executable instructions embodying any one, or all, of the methodologies described herein, resides completely, or at least partially, in or on a machine-readable storage medium, e.g., in the static memory 105 or, when loaded and being executed, in the main memory 106. For example, the instructions may include software processes implementing the request processing functionality of the search platform 1. The instructions may further be transmitted or received as a propagated signal via the Internet through the network inter-face device 103 or via the user interface 102. Communication within computing machine 100 is performed via a bus 104. Basic operation of the computing machine 100 is controlled by an operating system which is also located in the memory 106, the at least one processor 101 and/or the static memory 105.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable pro-gram instructions for carrying out operations of the embodiments of the invention may be, for example, assembly language or either source code or object code written in any combination of one or more programming languages.

In certain alternative embodiments, the functions and/or acts specified in the flowcharts, sequence diagrams, and/or block diagrams may be re-ordered, processed serially, and/or processed concurrently. Moreover, any of the flowcharts, sequence diagrams, and/or block diagrams may include more or fewer blocks than those illustrated consistent with embodiments and examples.

The terminology used herein is for the purpose of describing particular embodiments and examples, and is not intended to be limiting. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details.

The invention claimed is:

1. A method for handling search requests at a search platform, the method comprising:

receiving, from a client, a first search request indicating at least one first search parameter value;

receiving, from the client, a second search request indicating at least one second search parameter value, wherein the second search value differs from the first search value;

evaluating the at least one first search parameter value and the at least second search parameter value to determine a search context;

determining a distance between the first search parameter value and the second search parameter value based on a similarity or dissimilarity between the first search parameter value and the second search parameter value;

deriving at least one third search parameter value corresponding to the search context from the distance, wherein the at least one third search parameter value corresponds to a parameter value range derived from the distance between the first search parameter value and the second search parameter value, wherein deriving the at least one third search parameter value comprises: extending the parameter value range beyond the first and second search parameter values; and including or excluding the first and second search parameter values in the parameter value range;

determining if a cache accessible to the search platform stores at least a given number of search results for the at least one third search parameter value;

in response to determining that the cache does not store at least the given number of search results for the at least one third search parameter value, obtaining at least one search result for the at least one third search parameter value for storing in the cache;

receiving, from the client, a third search request indicating at least the third search parameter value;

retrieving at least one search result for the third search parameter value from the cache;

returning the at least one retrieved search result to the client.

2. The method of claim 1, further comprising receiving, from the client, one or more further requests respectively indicating at least a further search parameter value;

determining the search context based on an evaluation of the further search parameter value.

3. The method of claim 1, wherein determining the search context comprises determining that additional search parameter values in the first search request and in the second search request are identical;

determining a potential parameter value range for the at least one third search parameter value based on the distance between the first search parameter value and the second search parameter value and the identical additional search parameter values.

4. The method of claim 3, wherein determining the search context comprises:

determining that the distance between a search parameter value of a certain search parameter in the first search request and a search parameter value of the certain search parameter in the second search request have the distance beyond a given threshold;

discarding the certain search parameter from determining the search context.

5. The method of claim 1, wherein the third search parameter value is a value for a same search parameter of the first search parameter value and the second search parameter value, or wherein the third search parameter value is a value for a different search parameter than the search parameter of the first search parameter value and the second search parameter value.

6. The method of claim 1, further comprising:

receiving, from the client, a feedback indication for the at least one returned search result;

storing the feedback indication for future search context determinations.

7. The method of claim 1, wherein determining the search context comprises:

evaluating search parameter value distances and identical search parameter values from past search requests of the client and/or of other clients.

8. The method of claim 1, wherein a level of generality of the at least one third search parameter value is derived from a similarity of the first search parameter value and the second search parameter value.

9. A computing system comprising:

a processor; and a computer-readable storage medium having stored thereon program instructions that, when executed by the processor, causes the processor to perform a set of operations comprising for handling search requests at a search platform, the set of operations comprising:

receiving, from a client, a first search request indicating at least one first search parameter value;

receiving, from the client, a second search request indicating at least one second search parameter value, wherein the second search value differs from the first search value;

evaluating the at least one first search parameter value and the at least second search parameter value to determine a search context;

determining a distance between the first search parameter value and the second search parameter value based on a similarity or dissimilarity between the first search parameter value and the second search parameter value;

deriving at least one third search parameter value corresponding to the search context from the distance, wherein the at least one third search parameter value corresponds to a parameter value range derived from the distance between the first search parameter value and the second search parameter value, wherein deriving the at least one third search parameter value comprises: extending the parameter value range beyond the first and second search parameter values; and including or excluding the first and second search parameter values in the parameter value range;

determining if a cache accessible to the search platform stores at least a given number of search results for the at least one third search parameter value;

in response to determining that the cache does not store at least the given number of search results for the at least one third search parameter value, obtaining at least one search result for the at least one third search parameter value for storing in the cache;

receiving, from the client, a third search request indicating at least the third search parameter value;

retrieving at least one search result for the third search parameter value from the cache;

returning the at least one retrieved search result to the client.

10. The computing system of claim 9, wherein the set of operations further comprises:

receiving, from the client, one or more further requests respectively indicating at least a further search parameter value;

determining the search context based on an evaluation of the further search parameter value.

11. The computing system of claim 9, wherein determining the search context comprises:

determining that additional search parameter values in the first search request and in the second search request are identical;

determining a potential parameter value range for the at least one third search parameter value based on the distance between the first search parameter value and the second search parameter value and the identical additional search parameter values.

12. The computing system of claim 11, wherein determining the search context comprises:

determining that the distance between a search parameter value of a certain search parameter in the first search request and a search parameter value of the certain search parameter in the second search request have the distance beyond a given threshold;

discarding the certain search parameter from determining the search context.

13. The computing system of claim 11, wherein the third search parameter value is a value for a same search parameter of the first search parameter value and the second search parameter value, or wherein the third search parameter value is a value for a different search parameter than the search parameter of the first search parameter value and the second search parameter value.

14. The computing system of claim 9, wherein the set of operations further comprises:

receiving, from the client, a feedback indication for the at least one returned search result;

storing the feedback indication for future search context determinations.

15. The computing system of claim 9, wherein determining the search context comprises:

evaluating search parameter value distances and identical search parameter values from past search requests of the client and/or of other clients.

16. The computing system of claim 9, wherein a level of generality of the at least one third search parameter value is derived from a similarity of the first search parameter value and the second search parameter value.

17. A non-transitory computer-readable storage medium having stored thereon program instructions that, when executed by at least one computing device, causes the at least one computing to perform a method for handling search requests at a search platform, the method comprising:

receiving, from a client, a first search request indicating at least one first search parameter value;

receiving, from the client, a second search request indicating at least one second search parameter value, wherein the second search value differs from the first search value;

evaluating the at least one first search parameter value and the at least second search parameter value to determine a search context;

determining a distance between the first search parameter value and the second search parameter value based on a similarity or dissimilarity between the first search parameter value and the second search parameter value;

deriving at least one third search parameter value corresponding to the search context from the distance, wherein the at least one third search parameter value corresponds to a parameter value range derived from the distance between the first search parameter value and the second search parameter value, wherein deriving the at least one third search parameter value comprises: extending the parameter value range beyond the first and second search parameter values; and including or excluding the first and second search parameter values in the parameter value range;

determining if a cache accessible to the search platform stores at least a given number of search results for the at least one third search parameter value;

in response to determining that the cache does not store at least the given number of search results for the at least one third search parameter value, obtaining at least one search result for the at least one third search parameter value for storing in the cache;

receiving, from the client, a third search request indicating at least the third search parameter value;

retrieving at least one search result for the third search parameter value from the cache;

returning the at least one retrieved search result to the client.

* * * * *